United States Patent
Uchida

(10) Patent No.: US 10,960,747 B2
(45) Date of Patent: Mar. 30, 2021

(54) SUNROOF APPARATUS

(71) Applicant: AISIN SEIKI KABUSHIKI KAISHA, Kariya (JP)

(72) Inventor: Kinju Uchida, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 13 days.

(21) Appl. No.: 16/582,221

(22) Filed: Sep. 25, 2019

(65) Prior Publication Data
US 2020/0094663 A1 Mar. 26, 2020

(30) Foreign Application Priority Data
Sep. 25, 2018 (JP) .............................. JP2018-178551

(51) Int. Cl.
*B60J 10/82* (2016.01)
*B60J 7/043* (2006.01)

(52) U.S. Cl.
CPC ............. *B60J 10/82* (2016.02); *B60J 7/0435* (2013.01)

(58) Field of Classification Search
CPC ................................. B60J 7/0435; B60J 10/82
USPC ............. 296/216.02–216.05, 216.06–216.07, 296/216.09
See application file for complete search history.

(56) References Cited

U.S. PATENT DOCUMENTS
6,685,263 B2   2/2004 Sawada et al.

FOREIGN PATENT DOCUMENTS
JP   2003-165343   6/2003
JP   2005-162099   6/2005

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes a panel, a sunroof unit including a frame portion, and a pair of housings connecting a pair of front ends and a pair of rear ends of side frames in a vehicle width direction, and a sealing member formed in an annular shape, the sealing member attached to the frame portion, the sealing member arranged between the frame portion and a peripheral rim portion of an opening in a vehicle height direction over a whole periphery of the peripheral rim portion. The housings each is formed with an injection space formed in a tapered shape opening so as to include a meeting surface of the side frame, the meeting surface facing the housing, the injection space provided at a connection part between the housing and a part of the side frame, the part disposed above the sealing member. The injection space is filled with a sealant.

1 Claim, 3 Drawing Sheets

Vehicle inner side ←→ Vehicle outer side

Front ←                                    → Rear

SUNROOF APPARATUS

CROSS REFERENCE TO RELATED APPLICATIONS

This application is based on and claims priority under 35 U.S.C. § 119 to Japanese Patent Application 2018-178551, filed on Sep. 25, 2018, the entire content of which is incorporated herein by reference.

TECHNICAL FIELD

This disclosure generally relates to a sunroof apparatus.

BACKGROUND DISCUSSION

A known sunroof apparatus is disclosed in JP2005-162099A (hereinafter referred to as Patent reference 1). The sunroof apparatus disclosed in Patent reference 1 includes a frame-shaped base panel (housing), a sunroof unit, and plural panels. The base panel is mounted on a peripheral rim portion of an opening provided at a roof of a vehicle. The sunroof unit includes, for example, a pair of guide rails attached to the base panel at a lower portion thereof. The plural panels are arranged upward of the base panel and configured to close the opening of the roof.

The sunroof apparatus disclosed in Patent reference 1 generally includes an annular sealing member arranged between the sunroof apparatus and the base panel continuously over the whole periphery of the peripheral rim portion of the opening so as to cover the peripheral rim portion of the opening and all fixation members of the base panel. Accordingly, the sealing member inhibits water outside (water at an outer periphery of the sealing member) from entering inside of the vehicle.

Meanwhile, a sunroof unit may be considered to be mounted directly on a peripheral rim portion of an opening without a base panel. In particular, the sunroof unit is formed in a frame shape so as to be directly mounted on the peripheral rim portion of the opening, the frame shape formed by a pair of side frames mounted on guide rails and a housing connecting distal ends of the side frames with each other in a vehicle width direction.

In this case, in a case where only the annular sealing member is arranged between a set of the side frames and the housing and the sunroof unit over the whole periphery of the peripheral rim portion of the opening, water outside may enter inside through a clearance generated at connection parts provided at the side frames and the housing.

A need thus exists for a sunroof apparatus which is not susceptible to the drawback mentioned above.

SUMMARY

According to an aspect of this disclosure, a sunroof apparatus includes a panel configured to close an opening formed at a roof of a vehicle, a sunroof unit including a frame portion having a pair of side frames mounted on a pair of first rim portions serving as rim portions of the opening in a vehicle width direction, and a pair of housings mounted on a pair of second rim portions serving as rim portions of the opening in a vehicle front-rear direction, the pair of housings connecting a pair of front ends and a pair of rear ends of the pair of side frames in the vehicle width direction, the sunroof unit supporting the panel, and a sealing member formed in an annular shape, the sealing member attached to the frame portion, the sealing member arranged between the frame portion and a peripheral rim portion of the opening in a vehicle height direction over a whole periphery of the peripheral rim portion. The housings each is formed with an injection space formed in a tapered shape opening so as to include a meeting surface of the side frame, the meeting surface facing the housing, the injection space provided at a connection part between the housing and a part of the side frame, the part disposed above the sealing member. The injection space is filled with a sealant.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a sunroof apparatus will hereunder be explained. A vehicle front-rear direction is referred to as a front-rear direction, and upward and downward of the vehicle in a height direction are referred to as upward and downward, respectively. Inward of the vehicle in a vehicle width direction toward an inner side of a compartment is referred to as a vehicle inner side, and outward in the vehicle width direction toward an outer side of the compartment is referred to as a vehicle outer side.

Figure 1:
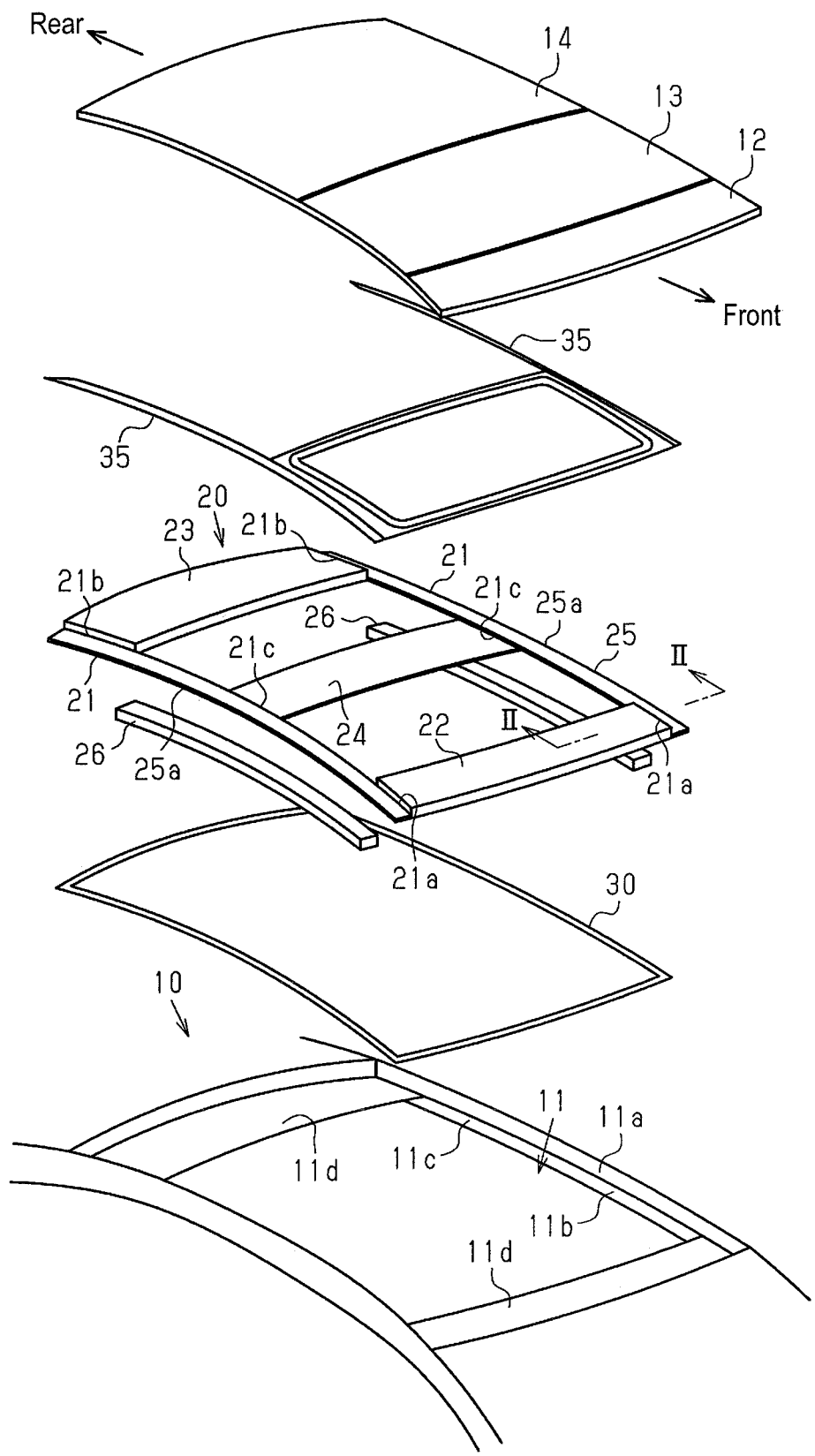
FIG. 1 is an exploded perspective view illustrating a structure of a sunroof apparatus according to an embodiment disclosed here.

As illustrated in FIG. 1, an opening 11 formed in a quadrilateral shape is provided at a roof 10 of the vehicle, for example, an automobile. The opening 11 includes an opening rim 11a formed in a quadrilateral cylindrical shape extending downwardly over the whole periphery thereof. The opening 11 further includes a peripheral rim portion 11b formed in a quadrilateral shape and protruding inwardly (toward a center of the opening 11) from a lower end of the opening rim 11a over the whole periphery of the opening rim 11a. The peripheral rim portion 11b includes a pair of first rim portions 11c and a pair of second rim portions 11d. The pair of first rim portions 11c extends in the front-rear direction at both sides of the opening 11 in the vehicle width direction. The pair of second rim portions 11d extends in the vehicle width direction at both sides of the opening 11 in the front-rear direction of the vehicle to be bridged over the pair of first rim portions 11c.

The roof 10 includes a front panel 12, a center panel 13, and a rear panel 14 that each serves as a quadrilateral panel made from a glass-made plate or a resin-made plate, and that are arranged next to one another in the front-rear direction. Each upper surface of the front panel 12, the center panel 13 and the rear panel 14 includes a design surface. The front panel 12 and the rear panel 14 are mounted on a front portion and a rear portion of the opening 11, respectively, so as to always close the opening 11. The center panel 13 is assembled so as to open and close a center portion of the opening 11 in the front-rear direction. In other words, the center panel 13 is assembled such that a rear part of the center panel 13 is lifted relative to a front part, the front part which serves as a fulcrum, and so as to slide in the front-rear direction. The center panel 13 opens and closes such that the center panel 13 slides while being maintained in a tilt-up state (so-called an outer-sliding method is adapted).

The sunroof unit 20 is mounted on the peripheral rim portion 11b. That is, the sunroof unit 20 includes a frame portion 25 having a pair of side frames 21, a front housing 22, a rear housing 23, and a center housing 24. The pair of side frames 21 is mounted on first rim portions 11c (both rim portions in the vehicle width direction) of the opening 11. The front housing 22 and the rear housing 23 serve as a pair of housings mounted on second rim portions 11d (both rim portions in the vehicle front-rear direction) of the opening 11 and connecting the front ends 21a of the side frames 21 with each other and the rear ends 21d of the side frames 21 with each other in the vehicle width direction. The center housing 24 connects middle portions 21c in the front-rear direction of the side frames 21 with each other in the vehicle width direction. The sunroof unit 20 includes a pair of guide rails 26 attached to the side frames 21 while being next thereto at the vehicle inner side. The side frame 21 is made from, for example, a metal plate. The front housing 22 and the rear housing 23 are made from, for example, a resin material (for example, a polypropylene material). The guide rail 26 corresponds to an extruded material made of aluminum alloy.

The front panel 12 is supported by the frame portion 25 (the sunroof unit 20) at the front housing 22, and the rear panel 14 is supported by the frame portion 25 (the sunroof unit 20) at the rear end portions of the side frames 21, the rear housing 23 and the center housing 24. The sunroof unit 20 includes a pair of functional components supported by the guide rails 26 so as to be movable in the front-rear direction. The center panel 13 is linked with and supported by the functional components so as to be bridged therebetween. The center panel 13 opens and closes in accordance with the movement of the functional components in the front-rear direction.

The sealing member 30 is made of urethane resin, is formed in a quadrilateral frame shape, and is arranged at a bottom surface of the frame portion 25 so as to be attached therewith. The sealing member 30 is arranged between the frame portion 25 and the peripheral rim portion 11b in the vehicle height direction over the whole periphery thereof so as to be pressurized therebetween. Meanwhile, a liner-shaped weatherstrip 35 made from an extruded material made of synthetic rubber of, for example, ethylene-propylene-diene-methylene or EPDM, or thermal plastic elastomer is attached to upper surfaces of rim portions 25a of the frame portion 25 provided in the vehicle width direction. The weatherstrip 35 is arranged between a set of the center panel 13 and the rear panel 14, and the side frame 21 in the vehicle height direction over substantially the whole length of the side frame 21.

Figure 2:
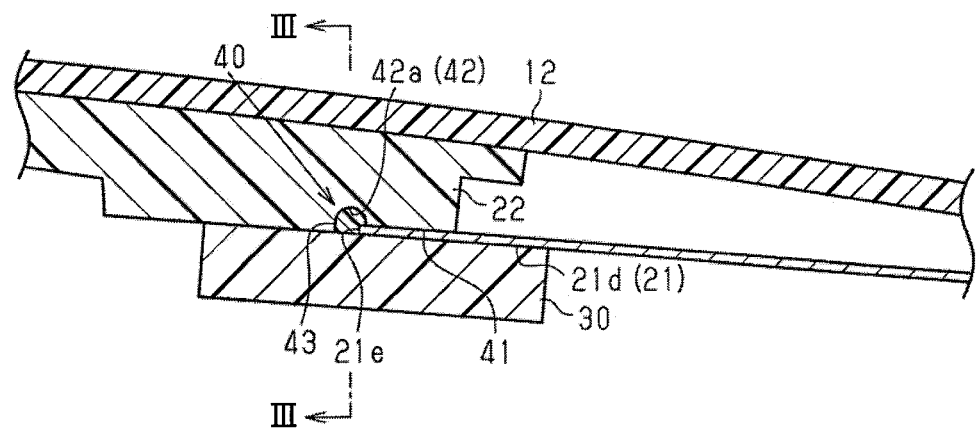
FIG. 2 is a cross sectional view taken along line II-II in FIG. 1.
Figure 3:
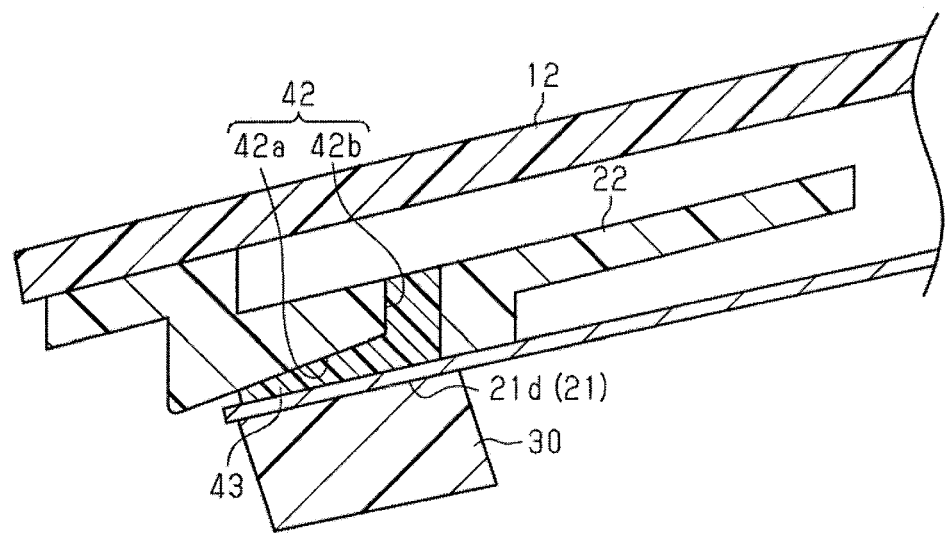
FIG. 3 is a cross sectional view taken along line III-III in FIG. 2.

Next, a watertight structure of the sealing member 30 will hereunder be explained. As illustrated in FIGS. 2 and 3, the sealing member 30 includes a constant cross-section which is formed in a quadrilateral shape. The side frames 21 each includes a flange portion 21d extending inwardly of the vehicle so as to overlap a part of the front housing 20 in the vehicle width direction. A part of a distal end portion of the flange portion 21d facing the front housing 22 is arranged above the sealing member 30. Meanwhile, a part of a distal end portion of the front housing 22 facing the flange portions 21d is arranged above the sealing member 30 so as to be matched with the flange portion 21d. The distal end portion of the front housing 22 is formed with a fitting recessed portion 41 being closely in contact with an upper surface of the flange portion 21d at least above the sealing member 30. The fitting recessed portion 41 and a peripheral rim portion thereof comprise a connection part 40 connected to the side frame 21.

The connection part 40 includes an injection space 42 opening so as to include a meeting surface 21e of the flange portion 21d facing the front housing 22, and an upper surface which is adjacent to the meeting surface 21e. The injection space 42 includes an injection path 42a formed in a substantially U-shaped groove recessed upwardly and extending in the front-rear direction. The injection path 42a is formed in a tapered shape narrowing gradually toward the front. The injection space 42 includes an injection port 42b passing through the connection part 40 in the vehicle height direction while communicating with rear end of the injection path 42a, the rear end which opens widely.

The injection space 42 is filled with a sealant 43 made of resin (for example, silicone resin or urethane resin). In other words, the meeting surface 21e and the upper surface and the lower surface of the flange portion 21d which are adjacent to the meeting surface 21e are covered with the sealing member 30 and the sealant 43.

A sealant for a frame is arranged between the lower surface of the fitting recessed portion 41 and the upper surface of the flange portion 21d, and inhibits water outside (entered from the outer periphery of the sealing member 30) from entering inside from between the lower surface of the fitting recessed portion 41 and the upper surface of the flange portion 21d.

Because the sealing member 30 attached to the lower surface of the side frame 21 is arranged between the lower surface of the side frame 21 and the upper surface of the peripheral rim portion 11b, the water outside is inhibited from entering inside between the lower surface of the side frame 21 and the upper surface of the peripheral rim portion 11b. Similarly, because the sealing member 30 attached to the lower surface of the side frame 21 is arranged between the lower surface of the front housing 22 and the peripheral rim portion 11b, the water outside is inhibited from entering inside between the lower surface of the front housing 22 and the upper surface of the peripheral rim portion 11b.

A sealant for a panel is arranged between the upper surface of the front housing 22 and the lower surface of the front panel 12, and the water outside is inhibited from entering inside from between the upper surface of the front housing 22 and the lower surface of the front panel 12.

The rear housing 23 is also provided with the same watertight structure by the sealing member 30 as the front housing 22 has, and the explanation will not be provided. The water entering from the outer periphery of the sealing member 30 shall be discharged outside of the vehicle through an appropriate discharging path.

According to the embodiment, following effects and advantages may be attained. In the aforementioned embodiment, the sealing member 30 is arranged between the peripheral rim portion 11b and the frame portion 25 over the whole periphery of the peripheral rim portion 11b of the opening 11. The injection space 42 of the connection part 40 arranged above the sealing member 30 is filled with the sealant 43. Accordingly, the meeting surface 21e and the upper and lower surfaces of the side frame 21 which are adjacent to the meeting surface 21e are covered with the sealing member 30 and the sealant 43. Thus, the water outside is inhibited from entering inside at the connection part 40.

Figure 4:
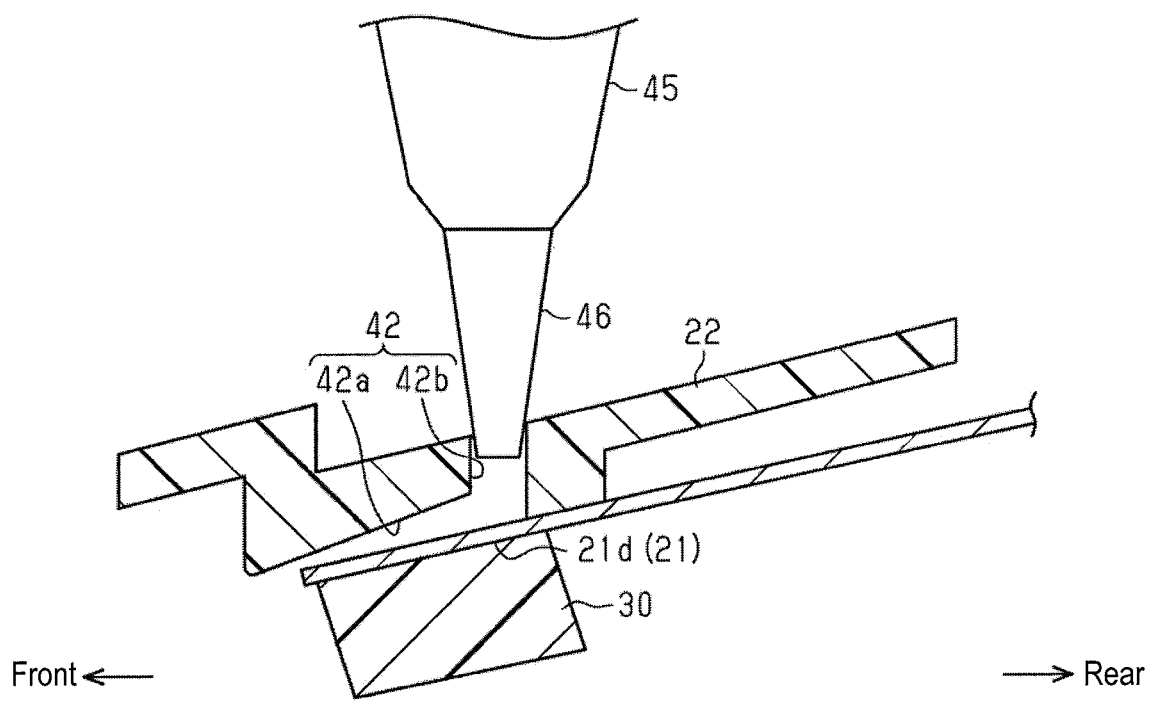
FIG. 4 is a cross sectional view illustrating a manufacturing method of the sunroof apparatus of an embodiment.

As illustrated in FIG. 4, the side frame 21 and the front housing 22 (the rear housing 23) which are previously assembled are attached with the sealing member 30 before the sealant 43 is injected to the injection space 42. In this state, an injection nozzle 46 of a sealant container 45 is inserted into the injection opening 42b, and the sealant 43 is injected from a wide opening of the injection path 42a. The injection path 42a is formed in the tapered shape, and the sealant 43 is delivered in an injecting direction (a flowing direction of the sealant 43) so that a clearance or a gap formed within the sealant 43 is inhibited from being generated at the injection port 42b.

Then, the front panel 12 (the rear panel 14) is attached on the front housing 22 (the rear housing 23) via the sealant for the panel.

According to the embodiment, the following effects and advantages may be attained. In the aforementioned embodiment, the housing 22, 23 may inhibit the water outside from entering inside at the connection part 40 at which the housing 22, 23 and the part of the side frame 21 are connected with each other, the part arranged above the sealing member 30. Specifically, because the injection path 42a (the injection space 42) is formed in the tapered shape, the clearance or the gap formed in the sealant 43 is inhibited from being generated at the injection space 42 by the sealant 43 which is delivered in the injection direction in a case where the sealant 43 is injected from the wide opening of the injection path 42a.

According to the aforementioned embodiment, even though an extending length of the flange portion 21b extending toward the injection space 42 is varied due to the variance of a component or a variance occurred at a time of manufacturing process, the variance may be reduced within the range of the opening dimension of the injection space 42, and the sealant 43 may securely cover the meeting surface 21e and the upper surface of the flange portion 21d being adjacent thereto.

According to the aforementioned embodiment, even though the frame portion 25 is configured by the side frames 21, front housing 22, and the rear housing 23 which are separately provided, the sealing properties may be secured relative to the peripheral rim portion 11b. Accordingly, the materials thereof may be free employed. Thus, the weight of the whole part of the frame portion 25 (the sunroof unit 20) may be reduced if the materials of the components are changed to, for example, lighter materials than the conventional materials.

In the aforementioned embodiment, because the sealant 43 is injected after the side frames 21, the front housing 22 and the rear housing 23 are attached with one another by the sealing member 30, the sealing properties may be secured even though the clearances differ from one another by the variances generated when manufactured or assembled.

In the aforementioned embodiment, because a base panel conventionally provided does not have to be included, either the weight of the sunroof apparatus or the number of components may be reduced, and accordingly, the cost may be reduced.

The aforementioned embodiment may be modified as follows. The aforementioned embodiment and a modified example explained below may be combined, for example, within a scope of the invention technically.

Figure 5:
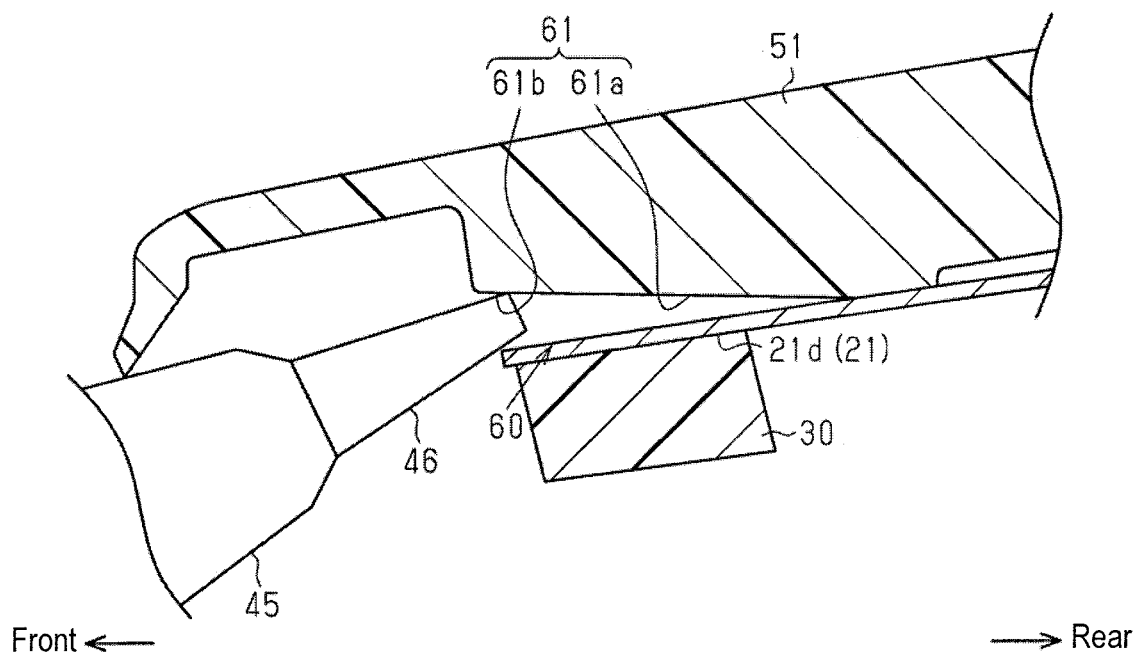
FIG. 5 is a cross sectional view of a sunroof apparatus of a modified example illustrating a structure and a manufacturing method thereof.

As illustrated in FIG. 5, a front housing 51 being integrated with the front panel 12 may be employed. In other words, an upper surface of the front housing 51 may be configured as a design surface. Even in this case, a connection part 60 which corresponds to the connection part 40 of the aforementioned embodiment of the side frame 21 and the front housing 51 is formed with an injection space 61 opening so as to include the meeting surface 21e of the flange portion 21d facing the front housing 51 and the upper surface being adjacent to the meeting surface 21e. The injection space 61 includes a substantially U-shaped injection path 61a recessed upwardly and extending in the front-rear direction. The injection path 61a includes a tapered shape closing gradually toward the rear. A front end of the injection path 61a opening wider as being extended in the front direction includes an injection port 61b.

In the modified example, the injection space 61 is filled with a sealant corresponding to the sealant 43. Accordingly, the flange portion 21d is covered with the sealant and the sealing member 30 at the meeting surface 21e and upper and lower surfaces being adjacent to the meeting surface 21e. However, in a case where the sealant is injected into the injection space 61, the injection nozzle 46 of the sealant container 45 is arranged by employing the space provided below the front housing 51, and the sealant is injected from a wide opening of the injection path 61a by the insertion of the injection nozzle 46 to the injection port 61b.

According to the aforementioned modified example, the following effects and advantages may be attained in addition to the effects and advantages attained by the aforementioned embodiment.

According to the modified example, the front housing 51 is integrally provided with the front panel 12 so that the number of components may be reduced. Because the sealant for the panel does not have to be provided, the sealant which is required in a case where, for example, the front panel 12 is separately provided, the manufacturing man-hour and the manufacturing cost may be reduced.

A rear housing integrally provided with the rear panel may be employed, the rear housing corresponding to the front housing 51.

According to the aforementioned embodiment, the injection space 42 may be tapered so as to be closed toward the rear.

According to the embodiment and the modified example, the housings 22, 23, 51 and the side frames 21 are connected with each other by the connection parts 40, 60 which are extended in the front-rear direction. Alternatively, for example, the housings 22, 23, 51 and the side frames 21 are connected with each other by the connection parts 40, 60 which are extended in the vehicle width direction. In this case, the injection space may be formed in a tapered shape being closed gradually towards the inner side of the vehicle, or toward the outer side of the vehicle.

According to the embodiment and the modified example, the front panel 12, the center panel 13 and the rear panel 14 support the sunroof unit 20. Alternatively, the number of panels may be one or plural other than three.

According to the aforementioned embodiment, the sunroof apparatus includes the panel 12 configured to close the opening 11 formed at the roof of the vehicle, the sunroof unit 20 including the frame portion 25 having the pair of side frames 21 mounted on the pair of first rim portions 11c serving as rim portions of the opening 11 in the vehicle width direction, the pair of housings 22, 23, 51 mounted on the pair of second rim portions 11d serving as rim portions of the opening 11 in the vehicle front-rear direction, the pair of housings 22, 23, 51 connecting the pair of front ends 21a and the pair of rear ends 21b of the pair of side frames 21 in the vehicle width direction, the sunroof unit 20 supporting the panel 12, 13, 14, and the sealing member 30 formed in an annular shape, the sealing member 30 attached to the frame portion 25, the sealing member 30 arranged between the frame portion 25 and the peripheral rim portion 11b of the opening 11 in the vehicle height direction over the whole periphery of the peripheral rim portion 11b. The housings 22, 23, 51 each is formed with the injection space 42, 61 formed in the tapered shape opening so as to include the meeting surface 21e of the side frame 21, the meeting surface 21e facing the housing 22, 23, 51, the injection space 42, 61 provided at the connection part 40, 60 between the housing 22, 23, 51 and the part of the side frame 21, the part disposed above the sealing member 30. The injection space 42, 61 is filled with the sealant 43.

According to the aforementioned configuration, the sealing member 30 is provided between the peripheral rim portion 11b and the frame portion 25 over the whole periphery of the peripheral rim portion 11b of the opening 11. The injection space 42, 61 of the connection part 40, 60 disposed above the sealing member 30 is filled with the sealant 30. Accordingly, the meeting surface 21e and the upper surface and the lower surface which are arranged adjacent to the meeting surface 21e of the side frame 21 are covered with the sealing member 30 and the sealant 43. Accordingly, external water (water entering from the outer periphery of the sealing member 30) may be inhibited from entering inside at the connection part 40, 60. Specifically, because the injection space 42, 61 is formed in the tapered shape, the injection space 42, 61 is inhibited from being generated with the clearance or the gap within the sealant 43 which is squeezed in a flowing direction in a case where, for example, the sealant 43 is injected from the wide opening of the injection space 42, 61.

The principles, preferred embodiment and mode of operation of the present invention have been described in the foregoing specification. However, the invention which is intended to be protected is not to be construed as limited to the particular embodiments disclosed. Further, the first embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus, comprising:
   a panel configured to close an opening formed at a roof of a vehicle;
   a sunroof unit including a frame portion having
      a pair of side frames mounted on a pair of first rim portions serving as rim portions of the opening in a vehicle width direction; and
      a pair of housings mounted on a pair of second rim portions serving as rim portions of the opening in a vehicle front-rear direction, the pair of housings connecting a pair of front ends and a pair of rear ends of the pair of side frames in the vehicle width direction, the sunroof unit supporting the panel; and
   a sealing member formed in an annular shape, the sealing member attached to the frame portion, the sealing member arranged between the frame portion and a peripheral rim portion of the opening in a vehicle height direction over a whole periphery of the peripheral rim portion; wherein
   the housings each is formed with an injection space formed in a tapered shape opening so as to include a meeting surface of the side frame, the meeting surface facing the housing, the injection space provided at a connection part between the housing and a part of the side frame, the part disposed above the sealing member; and
   the injection space is filled with a sealant.

* * * * *